(12) United States Patent
Nakajima

(10) Patent No.: US 7,665,029 B2
(45) Date of Patent: Feb. 16, 2010

(54) DEVICE FOR ASSISTING DEVELOPMENT OF USER APPLICATION FOR IMAGE FORMING DEVICE

(75) Inventor: Kouki Nakajima, Osaka (JP)

(73) Assignee: Kyocera Mita Corporation, Osaka-shi, Osaka (JP)

(*) Notice: Subject to any disclaimer, the term of this patent is extended or adjusted under 35 U.S.C. 154(b) by 432 days.

(21) Appl. No.: 11/805,692

(22) Filed: May 24, 2007

(65) Prior Publication Data
US 2007/0277116 A1    Nov. 29, 2007

(30) Foreign Application Priority Data
May 26, 2006    (JP)    ............... 2006-147411

(51) Int. Cl.
G06F 3/048    (2006.01)
(52) U.S. Cl. ...................................... 715/771; 715/763
(58) Field of Classification Search .................. 715/771, 715/762, 763
See application file for complete search history.

(56) References Cited

U.S. PATENT DOCUMENTS

2006/0259499 A1* 11/2006 Moulckers et al. .......... 707/100
2007/0055976 A1* 3/2007 Ward et al. .................. 719/329
2007/0157096 A1* 7/2007 Keren et al. ................. 715/760
2009/0006992 A1* 1/2009 Gilboa ........................ 715/763
2009/0204914 A1* 8/2009 King et al. .................. 715/763

FOREIGN PATENT DOCUMENTS

JP    2005 80019    3/2005

* cited by examiner

Primary Examiner—Dennis Bonshock

(57) ABSTRACT

A method for creating a device for assisting in development of a user-friendly user application program. The device includes a processor, a storage unit for storing a program, a display unit, and an input unit, in addition to an operation panel, image input unit and output units. The operation panel has icons, such as image input and output icons, and areas including icon, program design, display panel design, and source code areas. The program includes an image input module, an image output module, and an operation panel control module. When placing the image input and output icons into the design area with a drag-and-drop operation, the icons will automatically be associated to each other, and a user application program will be automatically generated in the source code area, based on the button icon and the associated image input and image output icons.

7 Claims, 14 Drawing Sheets

```
!START!
SAVE
If button 200,60,60,40 Submit Invoice is pushed then{
   SCAN ;
   FAX = Address Book (Acct Dept);
   E- MAIL = Address Book (John Smith);
}
!END!
```

USER APPLICATION

Submit Invoice

DEVICE FOR ASSISTING DEVELOPMENT OF USER APPLICATION FOR IMAGE FORMING DEVICE

FIELD OF INVENTION

The present invention relates to a device for assisting in development of user application used for an image forming device having an image input unit for reading a document image, receiving image data, and reading out image data from memory area, and an image output unit for forming an image on a paper, transmitting image data, and storing image data into the memory area.

The present invention particularly relates to a device for assisting in development of a user application to be executed on an image forming device on which a simple text language processing program is installed for executing interpretation of a user application program.

BACKGROUND OF THE INVENTION

An image forming device, especially a MFP has been further developed to offer more functions to meet a variety of needs by the user.

Multi-functionalization of image forming devices, however, complicates a menu design of an operational panel by increasing menu items and lowers usability. More specifically, the multi-functionalization increases functions unnecessary to the user, along with more buttons for the user to press in order to execute a function. Such complicated procedure naturally lowers the usability.

To address this issue, Japanese Application Laid-Open No. 2005-80019 discloses a method of writing a command combining a plurality of operations in the XML language and executing it.

Nevertheless, the method accompanies an execution of a processing unparallel to the operation panel, so that the user unfamiliar with programming will experience inconvenience.

SUMMARY OF THE INVENTION

An object of the present invention is to address such issues by providing a device for assisting in development of a user application for an image forming device which enables easy creation of a user-friendly user application program.

According to an aspect of the present invention, the device for assisting in developing a user application for an image forming device includes a processor, a memory area storing a program, a display unit, and an input unit. The storage unit, the display unit, and the input unit are connected to the processor.

The program directs the display unit, by placing image input and output icons in an icon area, to display them therein. The image input icon module operates an image input unit installed on the image forming device to acquire image data. An image output module directs the image output unit to provide the image data to an image output unit installed on the image forming device. The image input and the image output icons correspond to the image input and the image output modules, respectively.

The program further directs the display unit, by placing a button icon in a display panel design area, to display the button icon therein. The button icon corresponds to an operation panel control module which manages display of a button on an operation panel and detection of pressing of the button when pressed.

According to operation at the input unit, the program drag-and-drops the button icon from the icon area into the display panel design area.

According to operation at the input unit, the program drag-and-drops a selected image input or output icons from the icon area into a program design area to associate the image input icon and the image output icon placed in the program design area.

The program creates a user application program for an image forming device, based on the button icon and the associated image input and image output icons.

The user application program displays the button on the operation panel according to a location of the button icon in the display panel design area and detects pressing of the button. In response to the detection, the user application program first activates an image input module corresponding to the image input icon in the program design area, followed by the image output module corresponding to the image output icon in the program design area.

According to an aspect of the device of the present invention for assisting in developing a user application for an image forming device, the program further directs the display unit, by placing in the icon area an attributes icon corresponding to an argument for the image output module, to display the icon therein.

A selection list for the argument is provided to the attributes icon.

According to operation at the input unit, the program drag-and-drops the selected attributes icon from the icon area into the program design area.

The program theoretically connects the attributes icon placed in the program design area and the image output icon therein related to the aforementioned attributes icon so that the display unit displays the selection list for the argument by pairing it with the image output icon.

The user application program further provides an item selected from the selection list as an argument to the image output module paired with the selection list.

According to another aspect of the device of the present invention for assisting in developing a user application for an image forming device, if the image output icon is drag-and-dropped into the program design area when the image input icon has been placed therein, the program displays an arrow pointing in a direction from the image input icon to the image output icon.

According to another aspect of the device of the present invention for assisting in developing a user application for an image forming device, the program further directs the display unit to display a conversion icon corresponding to a data format conversion module by placing the icon in the icon area.

According to operation at the input unit, the program drag-and-drops the selected conversion icon from the icon area into the program design area.

When the conversion icon is placed on the arrow pointing in the direction from the image input icon to the image output icon, the user application program converts the image data acquired by the image input module corresponding to the image input icon from which the arrow points with the data format module to transfer the data to the image output module corresponding to the image output icon at which the arrow points.

In the configuration of an aspect of the present invention, the program drag-and-drops, according to operation at the input unit, the selected image input icon or image output icon from the icon area into the program design area. If the drag-and-dropped icon is an image input icon, the program associates it with an image output icon which has been placed in the program design area. If the drag-and-dropped icon is an image output icon, the program associates it with an image input icon which has been placed in the program design area.

Based on the button icon and the associated image input and image output icons, the program creates the user application program for an image forming device.

Accordingly, the user application program can be easily created.

Furthermore, the user application program displays a button on the operation panel according to a location of the button icon in the display panel design area and detects pressing of the button. In response to the detection, the user application program first activates the image input module corresponding to the image input icon in the program design area, followed by the image output module corresponding to the image output icon in the program design area. In this respect, the user application program is very user friendly.

A configuration according an aspect of the present invention directs the display unit, by placing in the icon area an attributes icon corresponding to an argument for the image output module, to display the icon therein.

The selection list for the argument is provided to the attributes icon. According to operation at the input unit, the program drag-and-drops the selected attributes icon from the icon area into the program design area.

The program theoretically connects the attributes icon placed in the program design area and the image output icon therein related to the aforementioned attributes icon so that the display unit displays the selection list for the argument by pairing it with image output icon.

The user application program further provides an item selected from the selection list as an argument to the image output module paired with the selection list. Accordingly, the user application program can be easily created.

The configuration of another aspect of the present invention, if the image input icon is drag-and-dropped into the program design area when the image input icon has been placed therein, the program displays the arrow pointing in the direction from the image input icon to the image output icon. Accordingly, operation of the user application program corresponds to one of the program upon its execution, and thus, creation of the user application program will be further easier.

The configuration of another aspect of the present invention converts, when the conversion icon is placed on the arrow pointing in the direction from the image input icon to the image output icon, image data acquired by the image input module corresponding to the image input icon from which the arrow points with the data format module.

The program then transfers the data to the image output module corresponding to the image output icon at which the arrow points. Accordingly, operation of the user application program corresponds to one of the program upon its execution, and thus, creation of the user application program will be further easier.

These and other objects, features and advantages of the present invention are specifically set forth in or will become apparent from the following detailed descriptions of the invention when read in conjunction with the accompanying drawings.

DETAILED DESCRIPTION OF THE INVENTION

Exemplary embodiments of the present invention are explained below with reference to the accompanying drawings though these embodiments are not intended to limit the invention. Additionally, in some instances, well-known structures, interfaces, and processes have not been shown in detail in order not to unnecessarily obscure the present invention.

Figure 13:
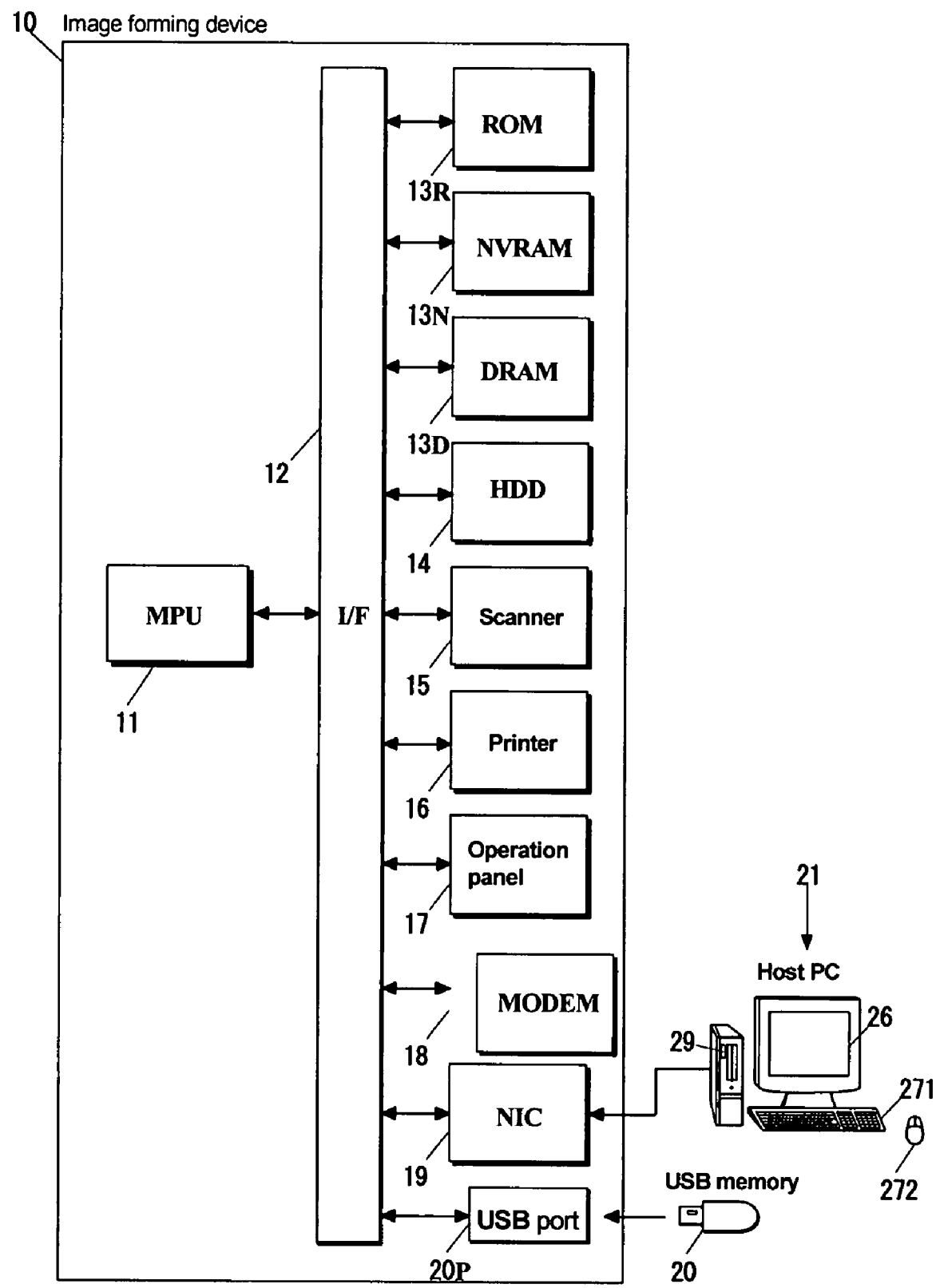
FIG. 13 is a schematic block diagram illustrating a hardware configuration of the image forming device of a preferred configuration of the present invention.

FIG. 13 is a schematic block diagram illustrating a hardware configuration of an image forming device 10 of a preferred configuration of the present invention.

An MPU 11 of the image forming device is connected to a ROM (Read only Memory) 13R, a NVRAM (Non-Volatile Random Access Memory) 13N, a DRAM (Dynamic Random Access Memory) 13D, a HDD (hard disk) 14, a scanner 15, a printer 16, an operation panel 17, a modem 18, a NIC (Network Interface Card) 19, and a USB port 20P through interface 12. To simplify, FIG. 13 indicates multiple interfaces with one block. The interface 12 includes a USB interface.

A ROM 13R stores a bootstrap and BIOS. The NVRAM 13N includes a flash memory and the like and stores an OS (operating system), an application which operates on the layer higher than that of the OS, and each type of device drivers which operate on the layer below that of the OS and configuration values for the drivers. The application makes the image forming device 10 function as a MFP having copying, scanning, printing, FAX (facsimile), and other functions. The HDD 14 is a data storage. The DRAM 13D provides a work area.

The scanner 15 is an image input unit for copying and FAX transmission. The printer 16 has a printer engine, a fuser unit, a paper input unit, a paper transfer unit, and a paper output unit. The printer 16 forms an electrostatic latent image, based on bitmap data provided as print data, on a photo conductive drum of the printer engine, develops the image with a toner, transfers and fuses the developed image onto a paper, and ejects the paper. The operational panel 17 includes a display unit and a key input unit and used for inputting configuration information or an instruction and displaying a selection screen, a configuration screen, and others. The MODEM 18 is used for FAX transmission and reception. The NIC 19 is connected to a host computer on a network to be used for a print job. A USB memory 20 connected to the USB port 20P has, for example, a flash memory chip.

Figure 14:
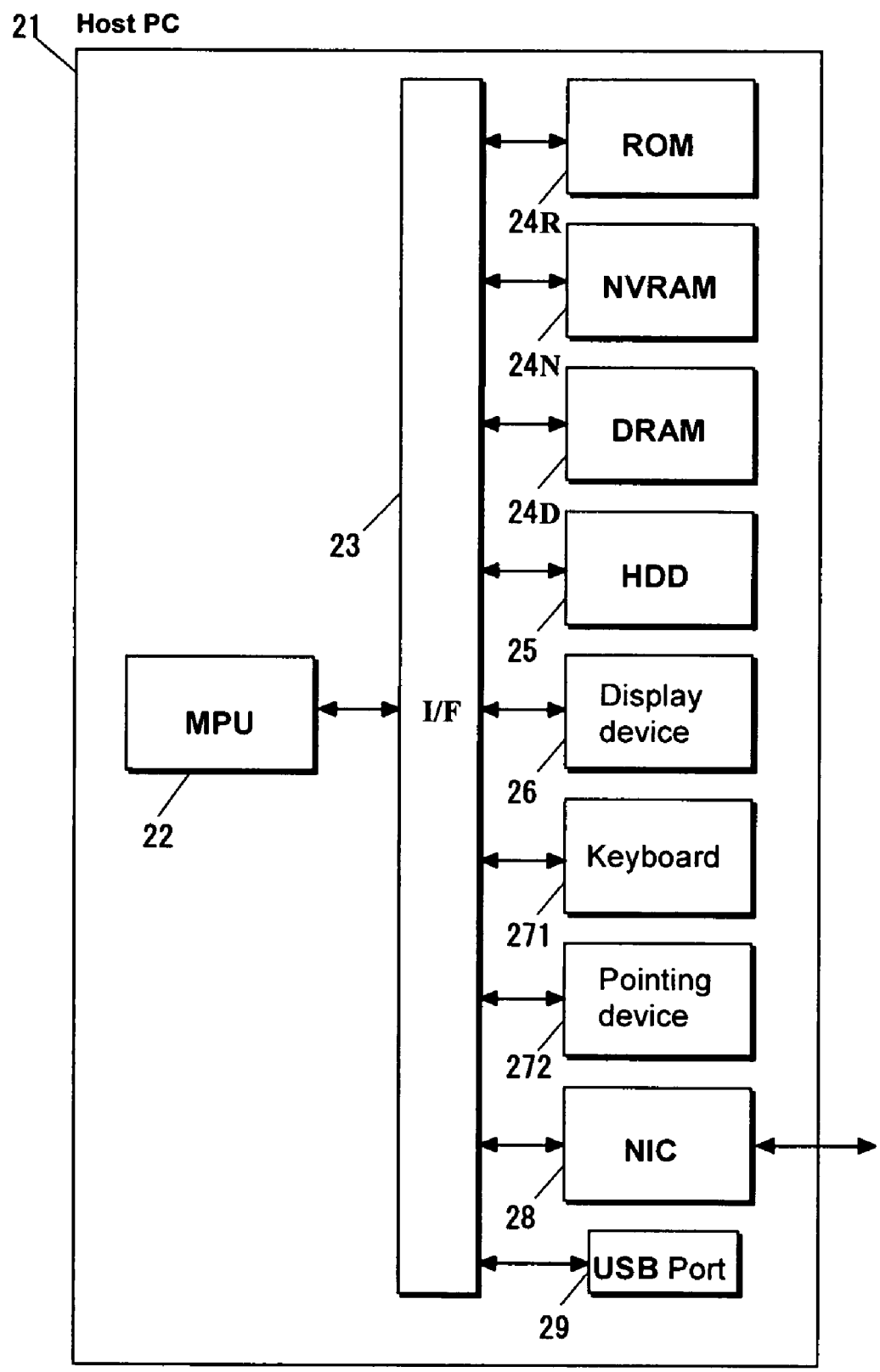
FIG. 14 is a schematic block diagram illustrating a hardware configuration of a device for assisting in developing a user application for an image forming device.

FIG. 14 is a schematic block diagram illustrating a hardware configuration of a host computer 21 which functions as a device for assisting in developing a user application for an image forming device.

A MPU 22 of the host computer 21 is connected to a ROM 24R, a NVRAM 24N, a DRAM 24D, a HDD 25, a display device 26, a keyboard 271, a pointing device 272, a NIC 28, and a USB port 29 through an interface 23. To simplify, FIG. 14 indicates multiple interfaces with one block.

The ROM 24R stores a bootstrap and BIOS. The NVRAM 24N stores configuration values of the system. The DRAM 24D is a main memory. The HDD 25 stores an OS, device drivers on the layer below that of the OS, and the application program on the layer above that of the OS. The application program includes a program for assisting in developing a user application for an image forming device.

Figure 12:
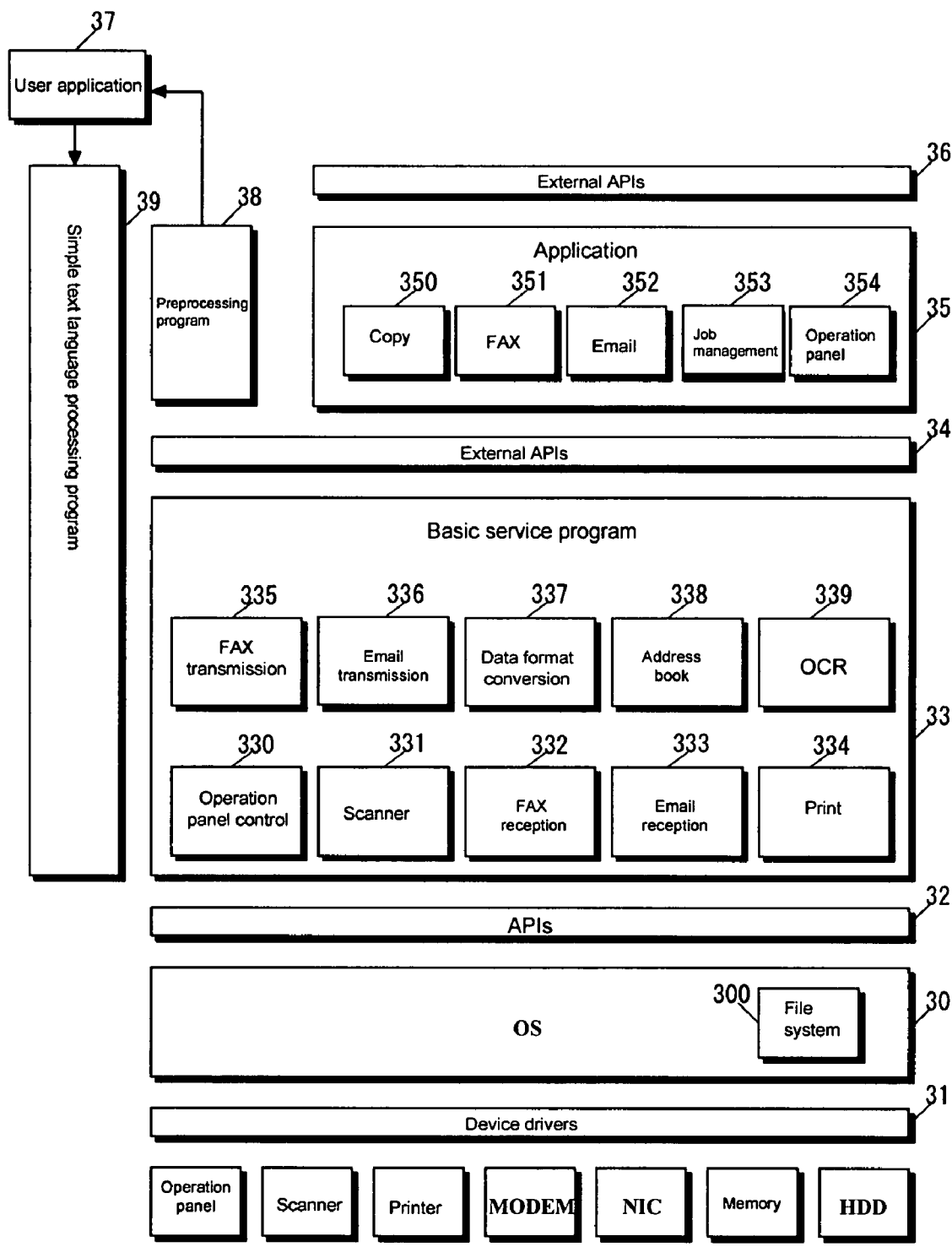
FIG. 12 is a schematic block diagram illustrating a software layer configuration of the image forming device of a preferred configuration of the present invention.

FIG. 12 is a schematic block diagram illustrating a software layer configuration of the image forming device 10 of a preferred configuration of the present invention.

Device drivers 31 are installed on the layer below that of the OS 30. Each driver included in the device drivers 31 correspond to each type of hardware. A basic service program 33 is provided on the layer above that of the OS 30. The basic service program 33 uses each type of functions included in the OS 30 through APIs (Application Program Interfaces) 32. The APIs 32 help the basic service program 33 use the aforementioned functions.

The basic service program 33 includes an operation panel control module 330, an image input module, a data processing module for processing image data acquired with the image input module, and an image output module for outputting the processed image data.

The operation panel control module 330 manages display of an operation button on the operation panel 17 and a detection of pressing of the button when pressed by the user.

The image input modules include a scanner module 331, a FAX reception module 332, and an email reception module 333. The image output modules include a print module 334, a FAX transmission module 335, and an email transmission module 336. The data processing modules include a data format conversion module 337 for converting a format of image data, a module for processing for including multiple pages per page, and a module for adding page numbers (not shown).

The basic service program 33 further includes utility modules. The utility modules are an address book module 338 for designating a recipient and an OCR (Optical Character Recognition) module 339 for recognizing a program (source code) written on a paper. Each module constituting the basic service program 33 uses functions of the OS 30 through the APIs 32.

An application 35 is provided on the layer above that of the basic service program 33. The external APIs 34 is placed in between the application 35 and the basic service program 33.

The application 35 is provided by a vender and includes a copy program 350, a FAX program 351, an email program 352, a job management program 353, and an operation panel program 354.

The programs 350 though 354 can be configured as a single integrated application or individual applications.

The application 35 is a program created with modules of the basic service program 33 through external APIs 34. For example, the copy program 350 is configured with a combination of the scanner module 331 and the print module 334. Alternatively, the FAX program 351 is configured with a combination of the FAX reception module 332, the FAX transmission module 335, and the address book module 338.

External APIs 36 are provided on the layer immediately above that of the application 35. The external APIs 36 use each type of functions of the application 35. Additionally, a preprocessing program 38 is installed on the same layer as that of the application 35.

The preprocessing program 38 generates a source code (text) from characters printed or written on a paper. The preprocessing program 38 is a program that uses the scanner module 331 and the OCR module 339 through corresponding APIs among the other external APIs 34. It is apparent to any skilled person that the preprocessing program 38 can be also configured in a way that it does not use the scanner module 331 when the OCR module 339 calls the scanner module 331.

The software of the image forming device 10 further includes a simple text language processing program 39 which is an interpreter for a user application 37. The program 39 executes the user application 37 by interpreting a command string of the user application 37 to use a program included in the basic service program 33 through the external APIs 34 or the application 35 through the external APIs 36. In this respect, the application 35 is an application service program for the simple text language processing program 39.

Figures 9A, 9B, 9C:
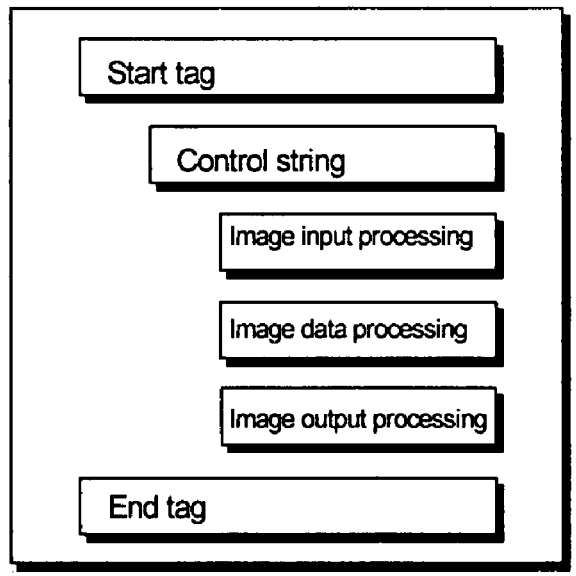
FIG. 9A is a description diagram of syntax of the simple text program.
FIG. 9B is a description diagram of an example of the program.
FIG. 9C is a view of a screen displayed on the operation panel upon execution of the program.

FIG. 9A illustrates syntax of the simple text program. FIG. 9B describes an example of the syntax.

In FIG. 9B, "!START!" is a start tag, and "!END!" is an end tag. They indicate an area for the simple text language processing program 39 to process.

"SAVE" below the start tag is a command for the simple text language processing program 39. After recognition of the source code, the command functions to store the source code on the DRAM 13D into the HDD 14.

Written in a conditional statement, which is a type of control string, "button 200, 60, 60, 40 Submit Invoice" is a set of parameters for displaying a button on the operation panel 17. A first set of parameters (200, 60) indicates a highest left coordinate of the button. A first value designates the number of pixels from a left corner of the display screen and a second value designates that from a top of it. A second set of parameters (60, 40) specifies the button size, each indicating a width and a length of the button. The following "Submit Invoice" is a character string to be written on the button.

The conditional statement will display the button shown in FIG. 9C on the operation panel 17. If the user press the button, the process in "{ }" will be executed in sequence.

More specifically, execution of the command string, "SCAN," will lead to reading of a document image by the scanner 15. Execution of the following command string, "FAX=Address Book (Acct Dept)," will transmit the read image data through the MODEM 18 as FAX data. The recipient number is a FAX number included in an "Acct Dept" field of an address book table.

Execution of the following command string, "E-MAIL=Address Book (John Smith)," will send an email to the sender of the FAX as a confirmation receipt. The address for the email to be sent is the email address included in a "John Smith" filed of the address book table.

Figure 10A:
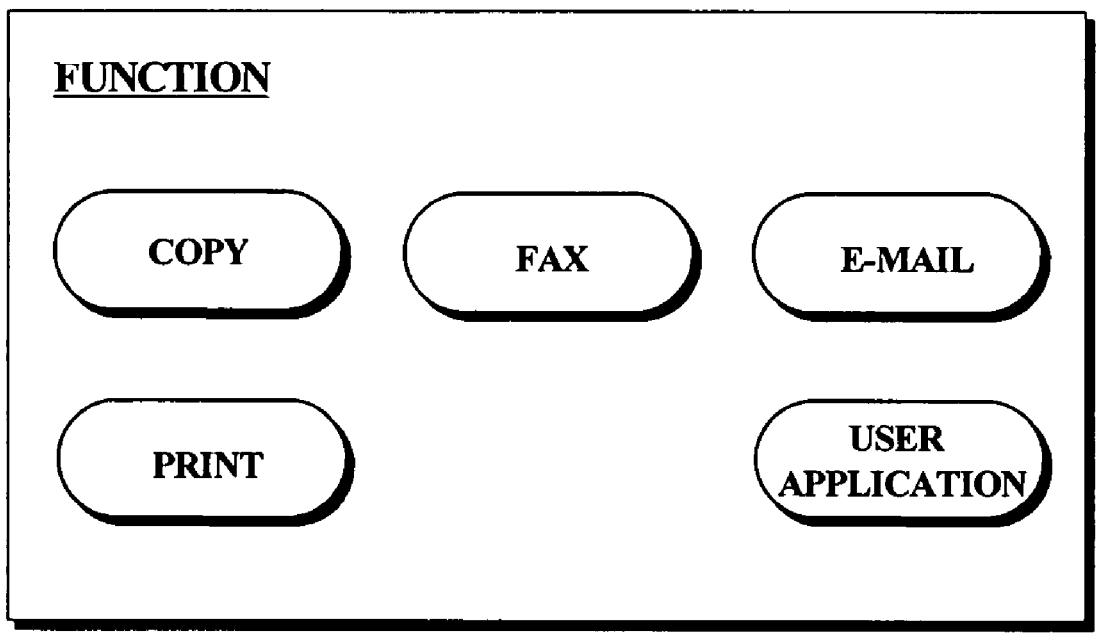
FIG. 10A is a view of the main menu screen.
Figure 10B:
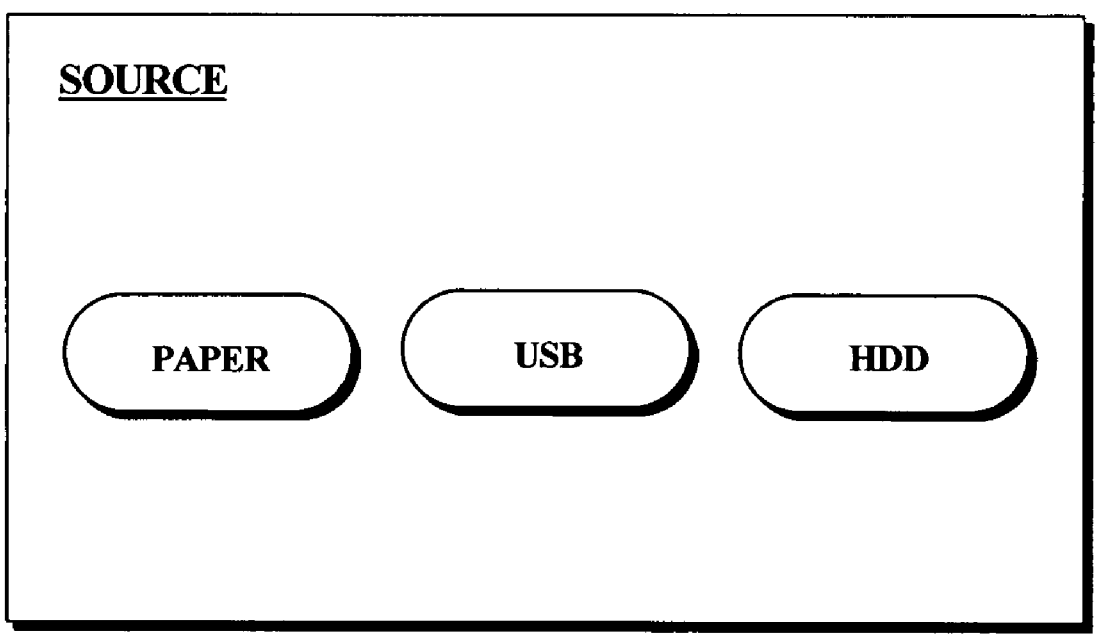
FIG. 10B is a view of the menu screen displayed when the "USER APPLICATION" of FIG. 10A is pressed.
Figure 11:
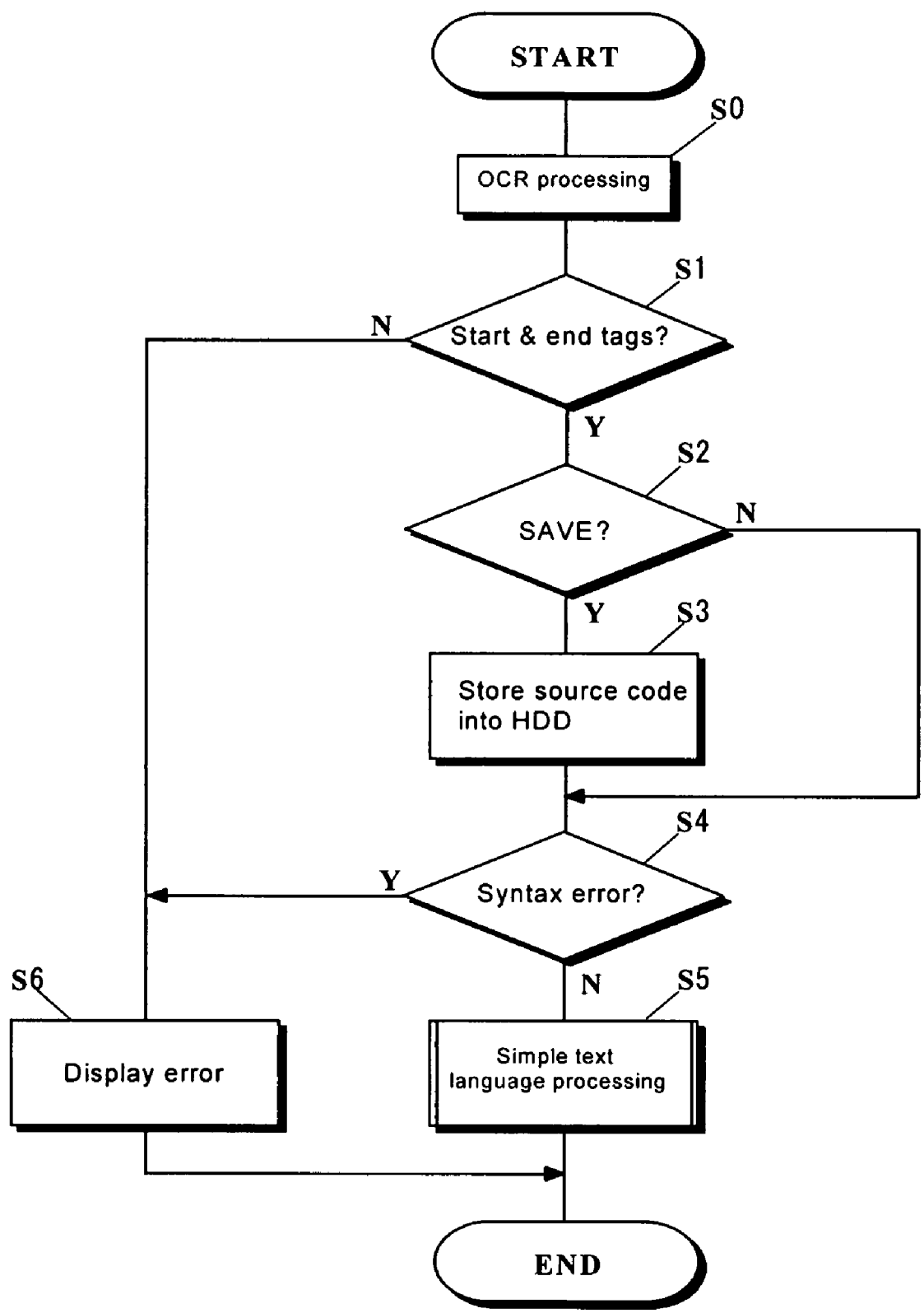
FIG. 11 is a schematic flowchart indicating a processing performed by the preprocessing program and the simple text language processing program.

FIG. 11 is a schematic flowchart indicating a processing performed by the preprocessing program 38 and the simple text language processing program 39 shown in FIG. 12. The processing is executed by pressing the "USER APPLICATION" button on the operation panel indicated in FIG. 10A, followed by selecting "PAPER" shown in FIG. 10B. Step S0 is performed by the preprocessing program 38. Steps S1 through S6 are performed by the simple text language processing program 39.

The preprocessing program 38 generates a source code by calling the scanner module 331 to direct the MPU 11 to read a document on the document table, then calling the OCR module 339 to direct the MPU 11 to recognize characters included in the document (step S0).

If there are a start and an end tags, operation proceeds to step S2, and if not, proceeds to step S6 (step S1).

If there is the command string, "SAVE," in the source code, the simple text language processing program 39 directs the MPU 11 to store the source code as a file into the HDD 14 through a file system 300 of the OS 30 (steps S 2 and S3).

The simple text language processing program 39 directs the MPU 11 to check syntax validity of each command string between the start and the end tags. If there is a syntax error, operation proceeds to step S6, and if not, proceeds to step S5 (step S4).

The simple text language processing program 39 directs the MPU 11 to interpret each command string in the source code and execute the string by using the appropriate program through the corresponding APIs (step S5).

An error description summary and an error code are displayed on the operation panel 17 to complete the processing (step S6).

Figure 8:
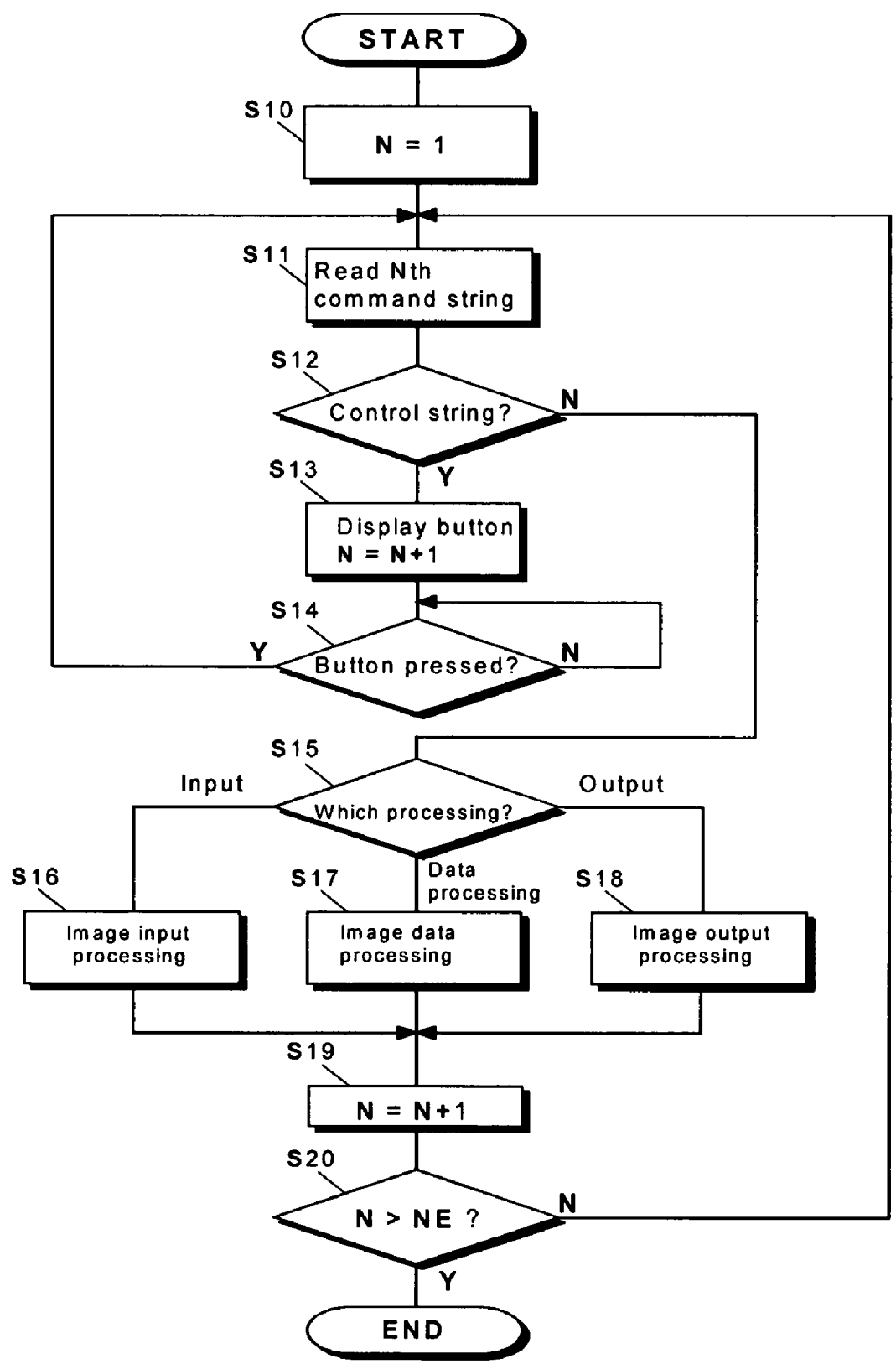
FIG. 8 is a schematic flowchart indicating a processing performed by the simple text language processing program. The simple text language processing program is installed on the image forming device of the present invention for executing interpretation of a user application program.

FIG. 8 is a detailed flowchart of step S5.

Assign a default value, "1," to "N," which is a variable for the line number of a command string in order from the beginning to the end in the source code (step S10).

Operation reads a command string on the Nth line in the source code, which follows the "SAVE" command string (step S11). A first command string in FIG. 9B is the aforementioned conditional statement that functions as a control string.

If the command string is a control string, operation proceeds to step S13. If not, operation moves to step S15 (step S12).

A button designated by the parameter as aforedescribed is displayed on the operation panel 17. Additionally, the variable N is incremented by "1" (step S13).

Operation is put on halt until the button being pressed. After the button being pressed, operation returns to step S11. During the wait, a processing for detecting pressing of the button is performed by generation of a timer interrupt, for example, every 20 mille second. Additionally, another time interrupt and other interrupt processings can be performed since a time interrupt enables parallel processing (step S14).

Depending on a type of processing, operation moves to a different step (step S15). If a command string relates to the image input processing, operation moves to step S16 (step S16). If a command string relates to the image data processing, operation proceeds to step S17 (step S17). If a command string relates to the image output processing, operation moves to step S18 (step S18).

A second command string in FIG. 9B is "SCAN." In this case, the simple text language processing program 39 calls the scanner module 331 in step S16, thereby a document image will be read.

A third command string in FIG. 9B is "FAX=Address Book (Acct Dept)." In this case, the address book module 338 is called with an argument, "Acct Dept," in step S18. Then, the FAX number will be acquired as a return value.

Next, the FAX transmission module 335 is called with the FAX number and a name of the image data acquired with the scanner module 331 as an argument. Thereby, FAX transmission will be executed.

A fourth command string in FIG. 9B is "E-MAIL=Address Book (John Smith)." In step S18, the address book module 338 is called with an argument, "John Smith," and an email address assigned to the value will be acquired as a return value. Then, the email transmission module 336 will be called with a set of argument, the address, and the file name, thereby email transmission will be executed.

The value N is incremented by "1" to proceed step S20 (step S19).

If the value N is larger than the value "NE" (N>NE), the processing will be terminated. If not, operation returns to step S11 (step S20). In FIG. 9B, "NE=4."

Alternatively, a file of the source code in the USB memory 20 can also be used instead of a source code of the user application on a paper.

More specifically, in FIG. 13, the user application can be created at a host PC 21, and the application can be stored in the USB memory 20 by inserting the USB memory 20 into a port 29 of the host PC 21. Eject the USB memory 20 from the port 29, and insert the memory into the USB port 20P of the image forming device 10.

Press the "USER APPLICATION" button on the operation panel 17 in FIG. 10A to display the menu shown in FIG. 10B. Select "USB" among other menus. The selection causes to transfer the user application from the USB memory 20 onto the DRAM 13D for processing step S1, and the succeeding steps indicated in FIG. 11 to be executed.

For using a file in the HDD 14, select a "HDD" menu among others in FIG. 10B.

Likewise, in FIG. 13, the source code of the user application including the start and the end tags can be transferred from the host PC 21 to the NIC 19 of the image forming device 10. In this case too, the user application will be transferred onto the DRAM 13D for processing step S1 and succeeding steps in FIG. 11 to be executed.

According to a preferred embodiment of the present invention, if a command string included in a source code is a control string, a parameter of a button description included in the control string is passed to the operation panel control module 330 as an argument to cause a button to be displayed on the operation panel 17 and pressing of the button to be detected when pressed by the user. In response to the detection, modules among the image input and the image output modules, which correspond to an image input processing command string and an image output processing command string included in the source code, following the control string will be activated. For example, the scanner module 331, the FAX transmission module 335, and the email transmission module 336 will be activated. Accordingly, function modules according to an operation button can be easily combined, thereby more user can easily use the application program.

Additionally, the parameter of the button description includes the position coordinate and the size of a button on the operation panel 17, and therefore, a button of any desired size can be easily placed on a desired location.

Furthermore, activation of the scanner module 331 directs the scanner 15 to read a document image, and the scanner 15 acquires the image data. Then, the OCR module 339 is activated to recognize characters included in the image data, thereby the source code of the application is acquired. Accordingly, the user can easily use a user application solely with the image forming device 10.

The following will describe a program for assisting in developing an above-mentioned user application.

Figure 2:
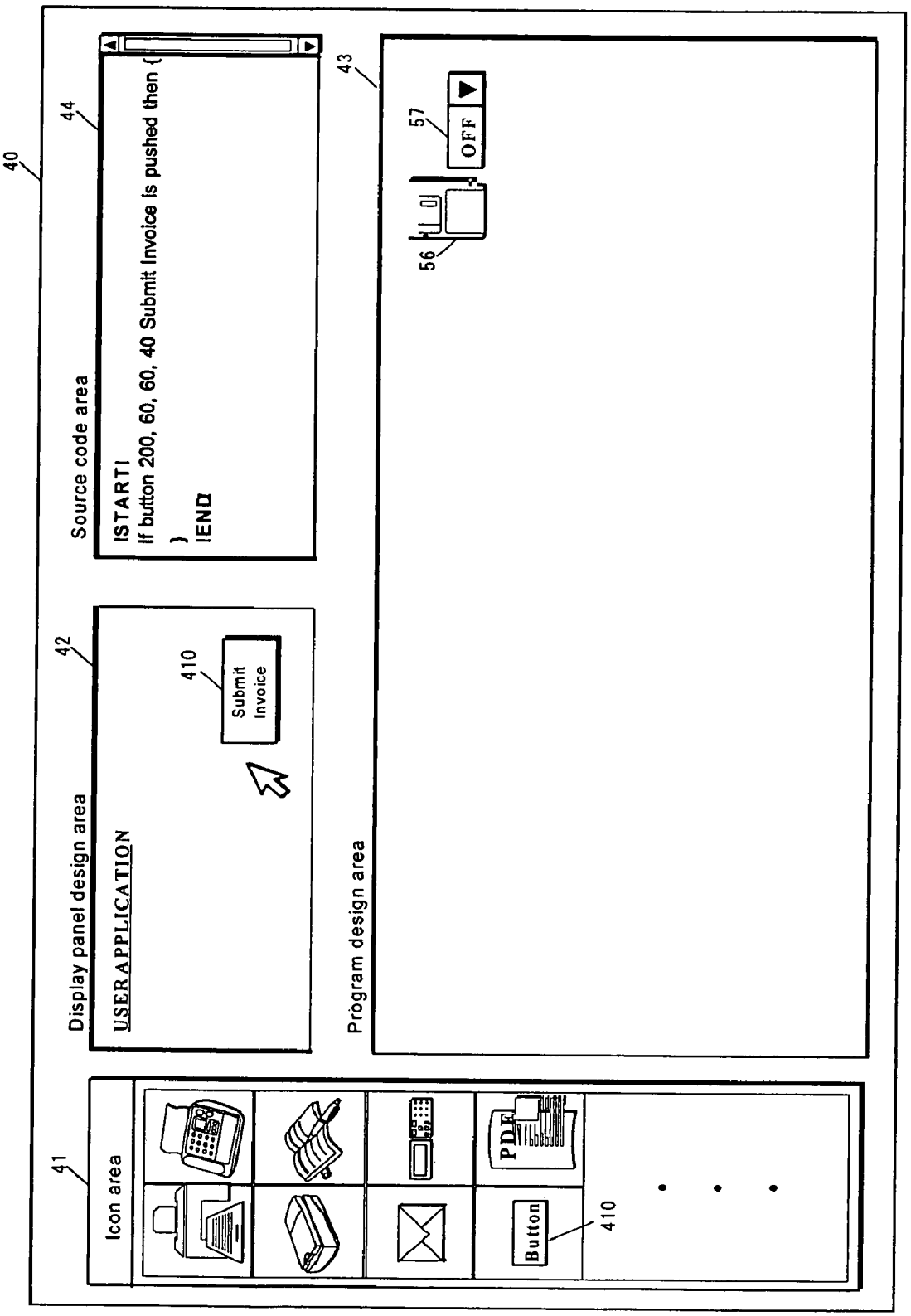
FIG. 2 is a description diagram illustrating a processing performed in FIG. 1. It shows a state that the button icon is placed into the display panel design area.

FIG. 2 is a description diagram of a screen displayed on the display device 26 of FIG. 13.

A screen 40 displays an icon area 41, a display panel design area 42, a program design area 43, and a source code area 44.

The icon area 41 includes icons corresponding to each module of the basic service program 33 and the application 35 of FIG. 12 and icons relating to arguments of the modules.

The user selects an icon by operating a pointing device 272, and performs a drag-and-drop upon the selected icon into the display panel design area 42 or the program design area 43.

If the user selects the ion other than an attributes icon, an appropriate command string to match the icon will be added in the source code area 44.

The start tag, "!START!," and the end tag, "!END!," are written in the source code area 44 as a default.

The abovedescribed operation will inserts the command string between the start and the end tags, or determines a parameter in the command string, thereby a source code for the user application for an image forming device will be created.

More specifically, a location coordinate and size of a button icon 410 in the area 42 in FIG. 2 will determine the parameter of the button by placing the button icon 410 corresponding to the operation panel control module 330 in the display panel design area 42. Additionally, a parameter of the string will be determined by pointing the inside of the button icon 410 with a pointing device 272 and inserting a character string for the button icon 410 with the keyboard 271. FIG. 2 shows an example of the parameter of the button icon 410 being determined. In FIG. 2, the location coordinate is (200, 60), the size of the button icon 410 is (60, 40), and the character string displayed thereon is Submit Invoice." Based on the determination, the control string "button 200, 60, 60, 40 Submit Invoice" will be added to the source code area 44.

A save icon 56 in the program design area functions to add a "SAVE" command in the source code area 44. By pointing and clicking a drop icon of a combo box next to the save icon 56 with the pointing device 272 to select "ON" in a list displayed, the "SAVE" command will be added.

In FIG. 2, since "OFF" is selected, the command will not be added.

Figure 1:
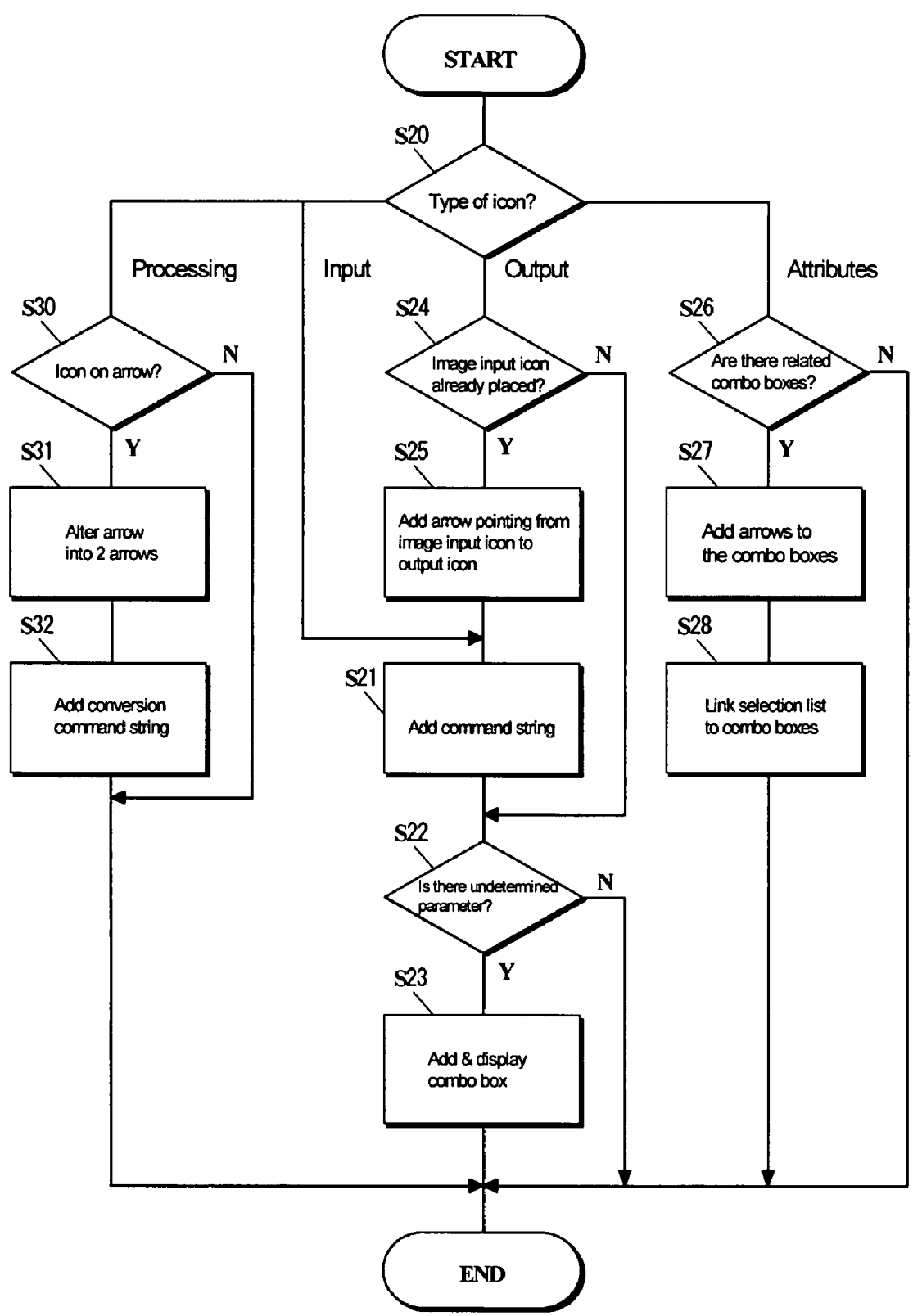
FIG. 1 is a schematic flowchart indicating a part of a program for assisting in developing a user application for an image forming device of a preferred embodiment of the present invention. More specifically, it is a flowchart indicating a process of how an event handler is activated upon an icon being dropped into the program design area.

FIG. 1 is a schematic flowchart indicates how an event handler is activated upon an icon being dropped into the display panel design area 42 or the program design area 43. The process will be described with reference to FIGS. 3 through 6 in the following.

Select a scanner icon 50 in the icon area 41 and drag-and-drop it into the program design area 43. The type of icon is determined as "image input" (step S20), and operation proceeds to step S21.

Figure 3:
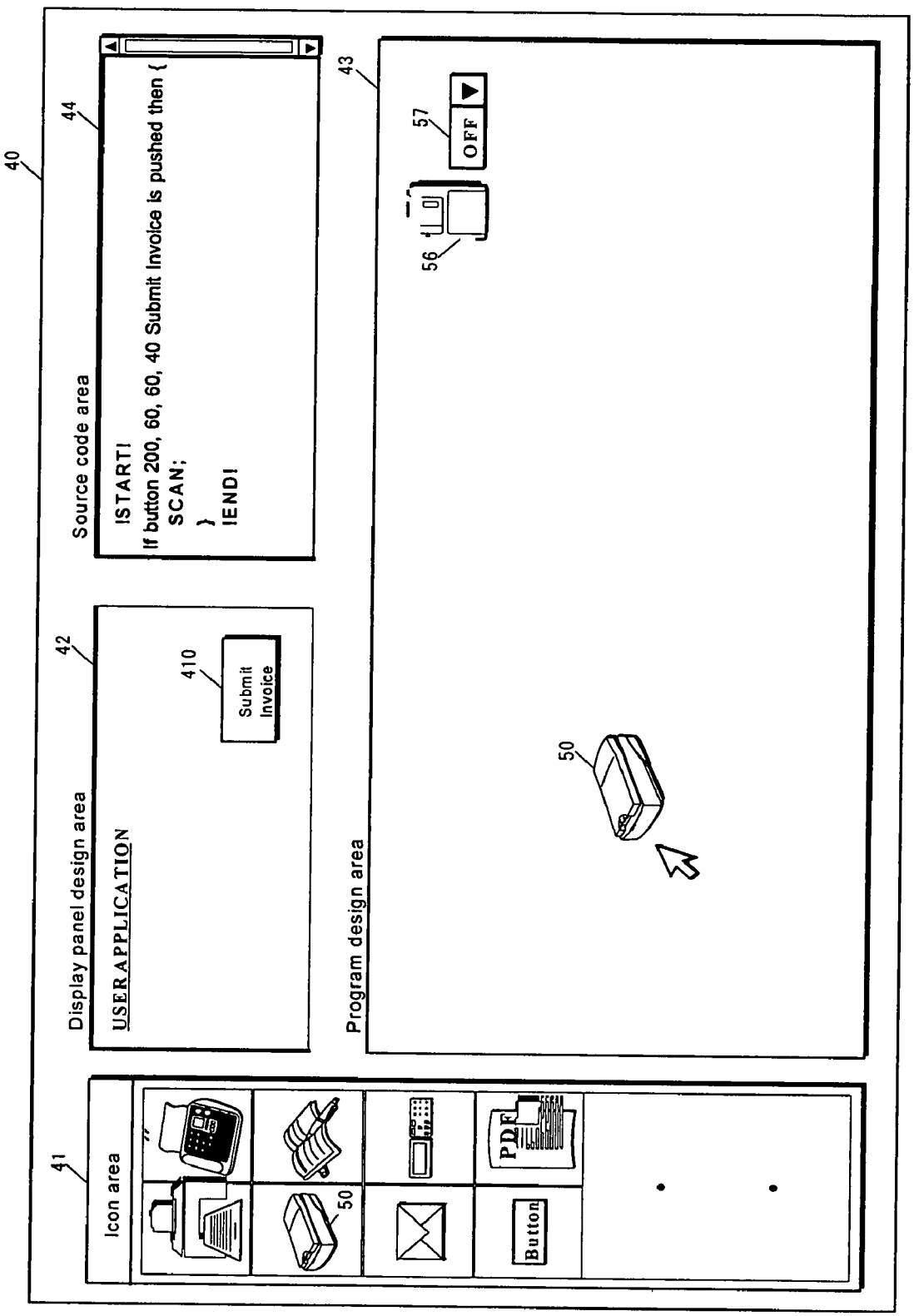
FIG. 3 is a description diagram indicating a processing performed in FIG. 1. It shows a state of a scanner icon being placed in the program design area, in sequence to the state shown in FIG. 2.

Add a command string corresponding to the icon dropped into the program design area 43 into the source code area 44. If the icon is the scanner icon 50, a command string, "SCAN," will be inserted into the source code area 44 as shown in FIG. 3 (step S21).

If the command string corresponding to the dropped icon includes an undetermined parameter, add a combo box will be displayed next to the icon, and the process will be terminated (steps S 22 and S23).

Next, select a FAX icon 51 in the icon area 41 and drag-and-drop it into the program design area 43. The type of icon is determined as "image output" (step S20), and operation proceeds to step S24.

If an icon indication image input is already placed in the program design area 43, an arrow will be displayed. The arrow points out from the image input icon to the icon dropped into the program design area 43, which indicates image output. Then, operation moves to the step S 21 (steps S 24 and S25).

Figure 4:
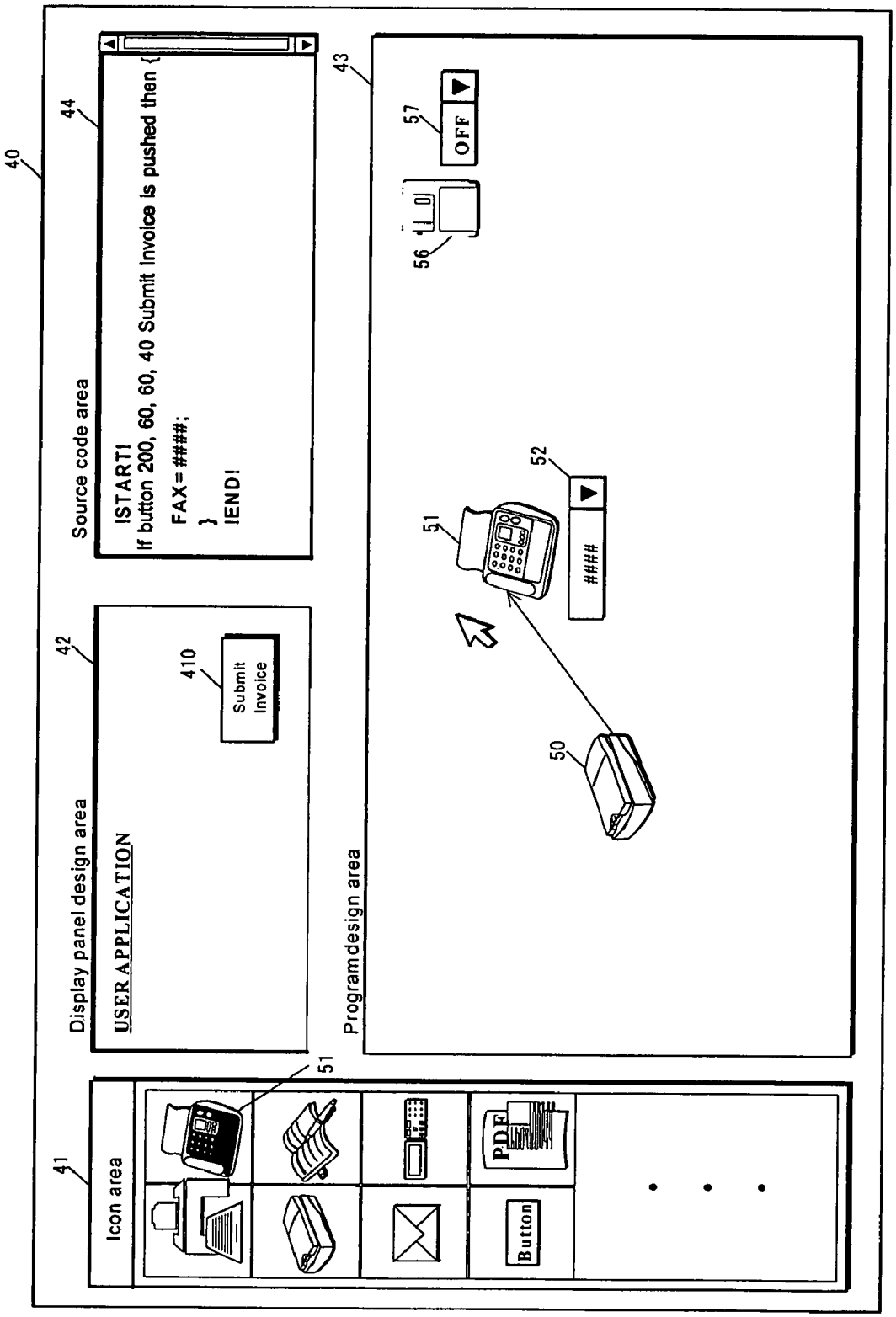
FIG. 4 is a description diagram indicating a processing performed in FIG. 1. It shows a state of a FAX icon being placed in the program design area, in sequence to the state shown in FIG. 3.

For example, if the dropped icon is the FAX icon 51, the arrow will be added as shown in FIG. 4 to point in a direction from the scanner icon for image input to the FAX icon 51. In this example, a command string, "FAX=####," will be added into the source code area 44 in the following step. The "####" indicates an undetermined argument (parameter). In step S 22, if the command string includes an undetermined parameter, a combo box 52 will be added next to the FAX icon 51 in step S 23.

Figure 5:
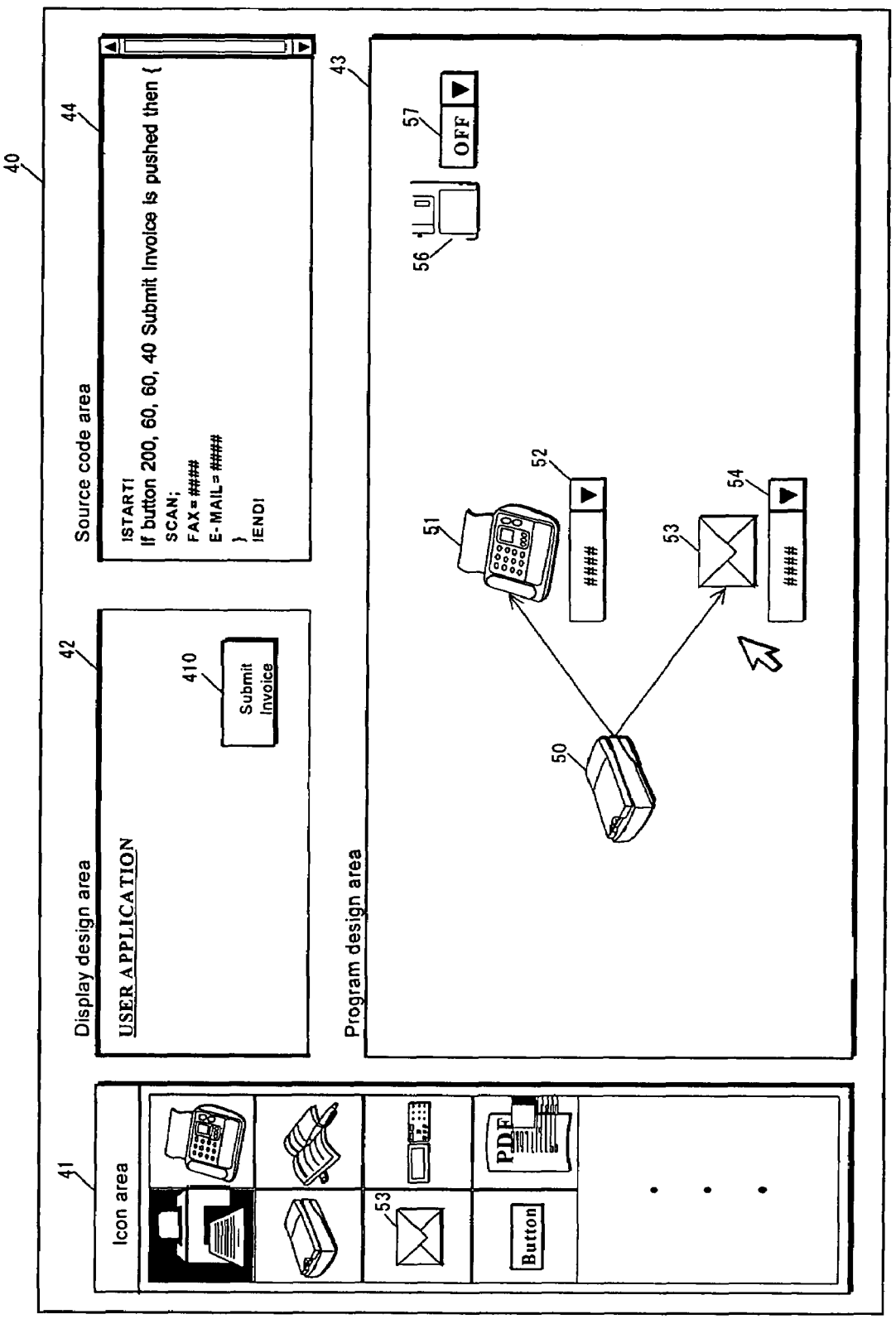
FIG. 5 is a description diagram indicating a processing performed in FIG. 1. It shows a state of an EMAIL icon being placed in the program design area, in sequence to the state shown in FIG. 4.

Alternatively, if the dropped icon is an EMAIL icon 53, the arrow will be added as shown in FIG. 5 to point in a direction from the scanner icon for image input to the EMAIL icon 53. In this example, a command string, "EMAIL=####," will be added into the source code area 44 in the following step S 21. In step S 22, if the command string includes an undetermined parameter, a combo box 54 will be added next to the EMAIL icon 53 in step S 23.

Directly inputting a recipient number and a recipient EMAIL address through a keyboard 271 into the combo boxes 52 and 54, respectively, the input values will be inserted into the corresponding command string in the source code area 44.

Alternatively, an address book created in advance can be used for the process instead of directly inputting the values. Selectively determining these parameters from the address book will result in easy and accurate input of recipient information.

First select an address book icon 55 in the icon area 41 and drag-and-drop it into the program design area 43. The type of icon will be determined as "attributes" in step S20, and operation proceeds to step S26.

Arrows pointing in a direction from the address book icon 55 to the related combo boxes 52 and 54 will be added in the program design area 43. Recipient lists will be displayed in a drop-down manner by pointing and clicking drop-down icons with the pointing device 272. More specifically, a table included in the address book will be linked to the combo boxes 52 and 54 (step S 26).

Figure 6:
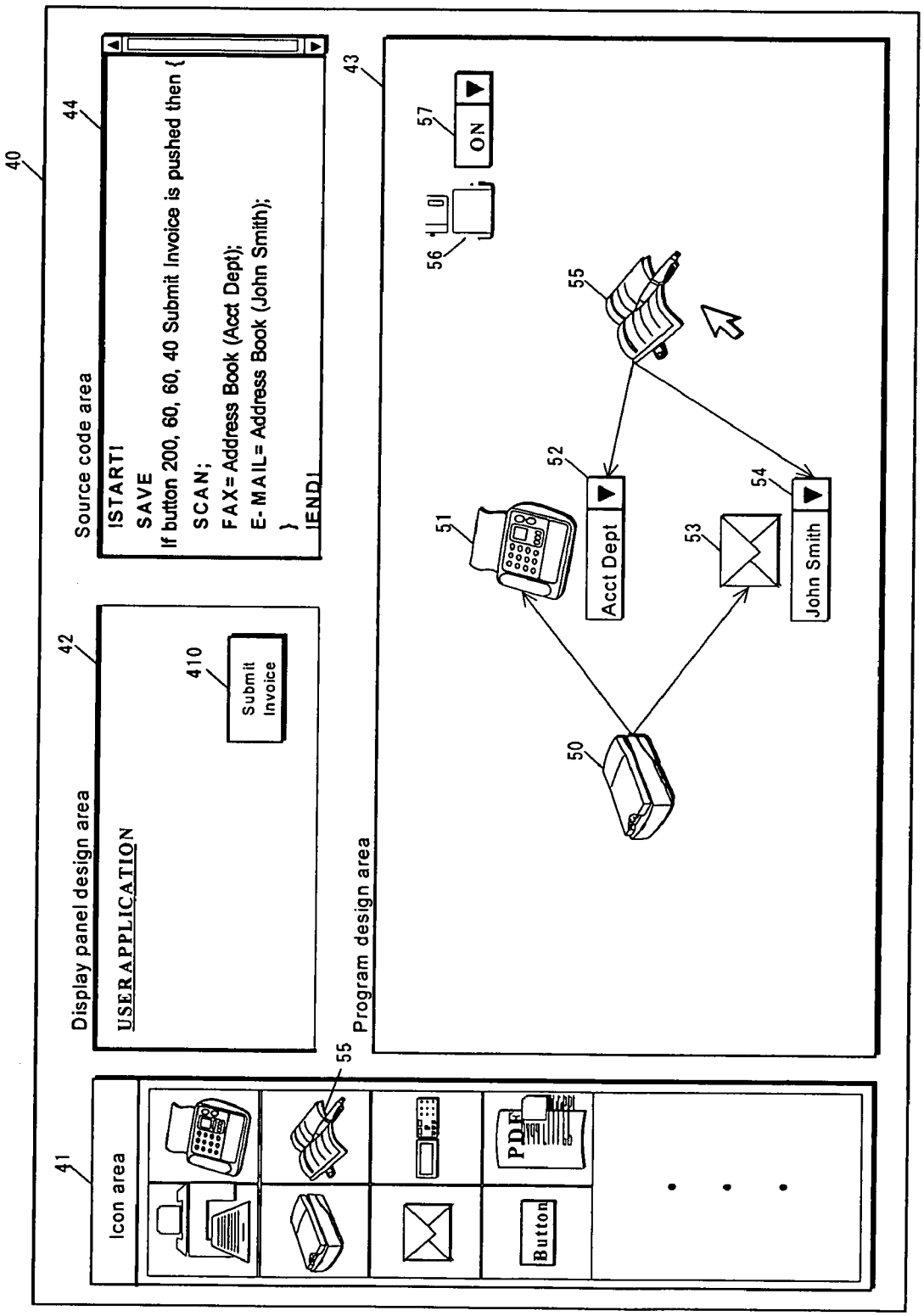
FIG. 6 is a description diagram indicating a processing performed in FIG. 1. It shows a state of a telephone book icon being placed in the program design area, in sequence to the state shown in FIG. 5.

The user points an item in the list to select with the pointing device 272, so that, as shown in FIG. 6, parameters for the FAX and the EMAIL transmission commands will be determined in the program design area 43 as well as the source code area 44.

Furthermore, if there are multiple image input icons placed in the program design area 43, an arrow will be added to point in a direction from one of the image input icons, such as the image input icon closest to the dropped image output icon, to said image output icon.

Figure 7:
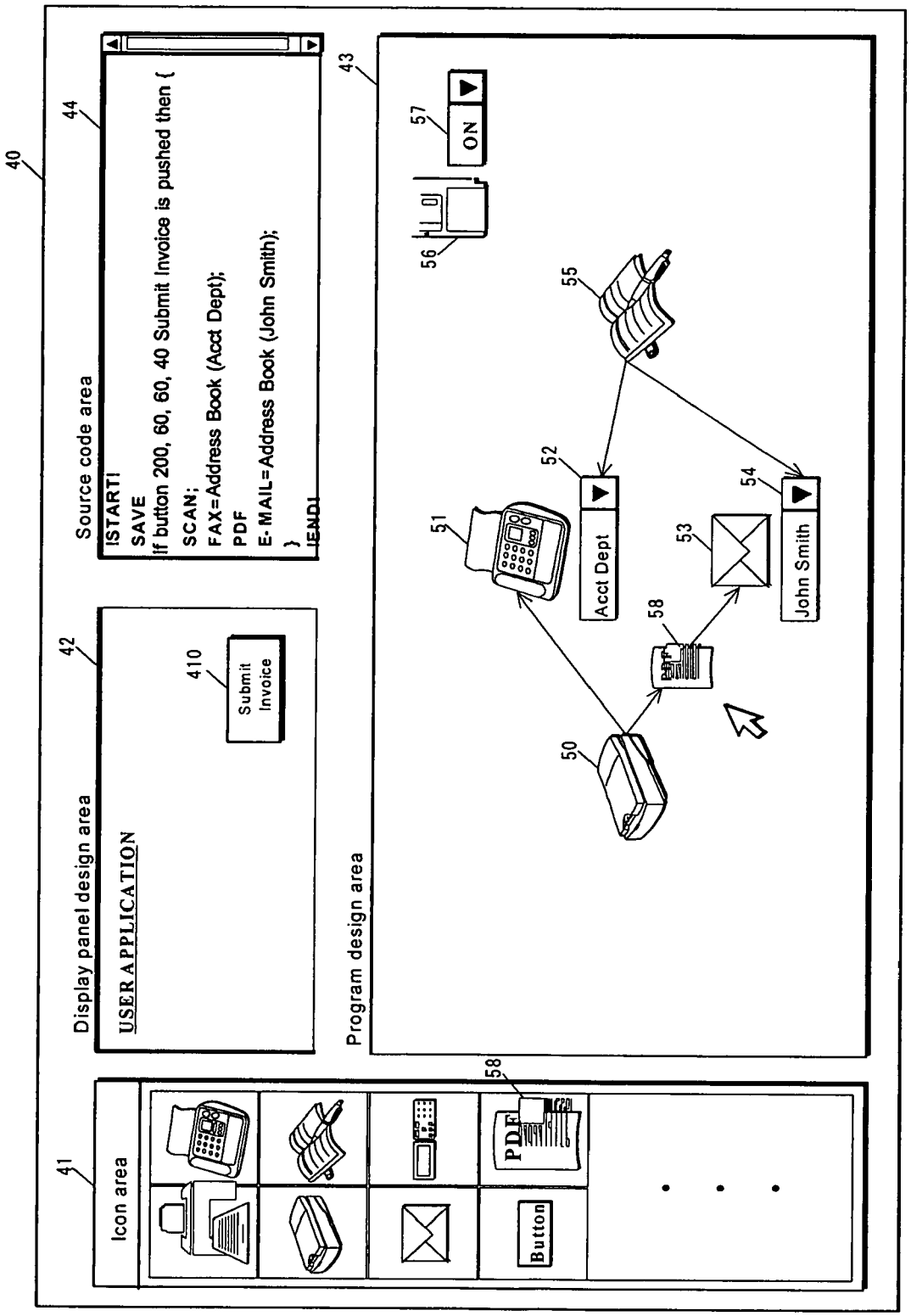
FIG. 7 is a description diagram indicating a processing performed in FIG. 1. It shows a state of a PDF conversion icon being placed in the program design area, in sequence to the state shown in FIG. 6.

FIG. 7 illustrates the configuration of FIG. 6 converting a bitmap file acquired by the scanner 15 into a PDF file prior to EMAIL transmission.

The user selects a PDF conversion icon 58 in the icon area 41 to drag-and-drop it on the arrow pointing in the direction from the scanner icon 50 to the EMAIL icon 53. Accordingly, the type of icon will be determined as "image processing" in step S 20 of FIG. 7 to proceed to step S 30.

If an icon is dropped on the arrow, the arrow will be altered into two separate arrows as shown in FIG. 7, one pointing at the icon, and the other pointing from the icon. Additionally, a command string corresponding to the icon will be inserted into the source code 44. In this example, the corresponding command string is "PDF" (steps S 30 through 32).

When the "PDF" command string is inserted, the simple text language processing program 39 calls the data format conversion module 337 to direct it to convert the image data acquired with the scanner module 331 in step S17 of FIG. 8 into a PDF file. Accordingly, the PDF file will be transmitted through email.

A preferred embodiment of a program for assisting in developing a user application for an image forming device of the present invention automatically generates a user application program in the source code area 44. When the user drag-and-drops attributes icons for image input, the image processing, and the image output icons, and placing them into the design area 43, the icons will automatically be associated to one another. Therefore, a user application program can be easily created.

Additionally, when the conversion icon 58 is placed on the arrow, the user application program further converts image data acquired by the image input module corresponding to the image input icon 50 from which the arrow points with the data format conversion module corresponding to the conversion icon 58. Then, the user application program transfers the converted data to the image output module corresponding to the image output icon to which the arrow points. Accordingly, the series of operation corresponds to that of execution of the program, and therefore, the creation of the user application program will be further easier.

Furthermore, several other types of configurations can also be applied to the present invention.

For instance, two return codes in sequence can be substituted for the end tag.

Alternatively, multiple application programs can be written to display a plurality of buttons on the display screen shown in FIG. 9C. Yet alternatively, one single application can be written to include multiple pairs of a conditional statement and a processing command string. These configurations enable display of multiple buttons on the display screen shown in FIG. 9C, which allow the users to manage office administration tasks through the single screen.

Furthermore, several other shapes and sizes of icons can be used to represent the buttons to be displayed on the operation panel 17.

The present document incorporates by reference the contents of Japanese priority document, Japanese Patent Application No. 2006-147411, filed in Japan on May 26, 2006.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A device for assisting in developing a user application for an image forming device which includes an operation panel, an image input unit, and an image output unit, the device, comprising:

a processor;
a storage unit for storing a program;
a display unit; and
an input unit, wherein the storage unit, the display unit, and the input unit are connected to the processor;
the operation panel, which simultaneously displays:
an icon;
an icon area;
a display panel design area;
a source code area; and
a program design area;
the program, further comprising:
an image input module;
an image output module; and
an operation panel control module which manages display of a button on the operation panel and detection of pressing of the button by placing a button icon on the display panel design area, wherein
the program (a) directs the display unit, by placing image input and output icons in the icon area, to display the icons therein, corresponding to the image input module which operates the image input unit installed on the image forming device to acquire image data and the image output module which provides the image data the image output unit installed on the image forming device, respectively, (b) directs the display unit to display the button icon which corresponds to the operation panel control, (c) drag-and-drops the button icon into the display panel design area, according to operation at the input unit, (d) drag-and-drops a selected image input icon or output icon, according to operation at the input unit, from the icon area to the program design area to associate the image input icon and the image output icon placed in the program design area,
(e) creates a user application program for an image forming device, based on the button icon and the associated image input and image output icons, and (f) output icons have associated combo boxes for use in supplying specific destination parameters, and are configured to accent input from another input device.

2. The device for assisting in developing a user application for an image forming device which includes an operation panel, an image input unit, and an image output unit of claim 1, wherein:

the user application program (f) displays a button on the operation panel according to a location of the button icon in the display panel design area and detects pressing of the button when pressed, and (g) in response to the detection, the user application program first activates the image input module corresponding to the image input icon in the program design area, followed by the image output module corresponding to the image output icon in the program design area.

3. The device for assisting in developing a user application for an image forming device which includes an operation panel, an image input unit, and an image output unit of claim 1, the device, wherein:

the program further directs the display unit to display attributes icon which is provided with a selection list of arguments, the attributes icon corresponding to arguments for the image output module by placing the icon in the icon area; and the program drag-and-drops the selected attributes icon from the icon area into the program design area to theoretically connect the attributes icon placed in the program design area and the image output icon therein related to the aforementioned attributes icon so that the display unit displays the selection list for the arguments by pairing with image output icon.

4. The device for assisting in developing a user application for an image forming device which includes an operation panel, an image input unit, and an image output unit of claim 2, the device, wherein:

the user application program further provides an item selected from the selection list as an argument to the image output module associated with the selection list.

5. The device for assisting in developing a user application for an image forming device which includes an operation panel, an image input unit, and an image output unit of claim 1, the device, wherein:

the program displays, if an image output icon is drag-and-dropped into the program design area when an image input icon has been placed on the program design area, an arrow pointing from the image input icon to the image output icon.

6. The device for assisting in developing a user application for an image forming device which includes an operation panel, an image input unit, and an image output unit of claim 1, the device, wherein:

the program further directs the display unit to display a conversion icon corresponding to a data format conversion module by placing the icon in the icon area, and drag-and-drops the selected conversion icon from the icon area into the program design area, according to operation at the input unit.

7. The device for assisting in developing a user application for an image forming device which includes an operation panel, an image input unit, and an image output unit of claim 6, the device, wherein:

the user application program converts, when the conversion icon is placed on the arrow pointing in the direction from the image input icon to the image output icon, image data acquired by the image input module corresponding to the image input icon from which the arrow points with the data format module to transfer the data to the image output module corresponding to the image output icon to which the arrow points.

\* \* \* \* \*